Figure 1:
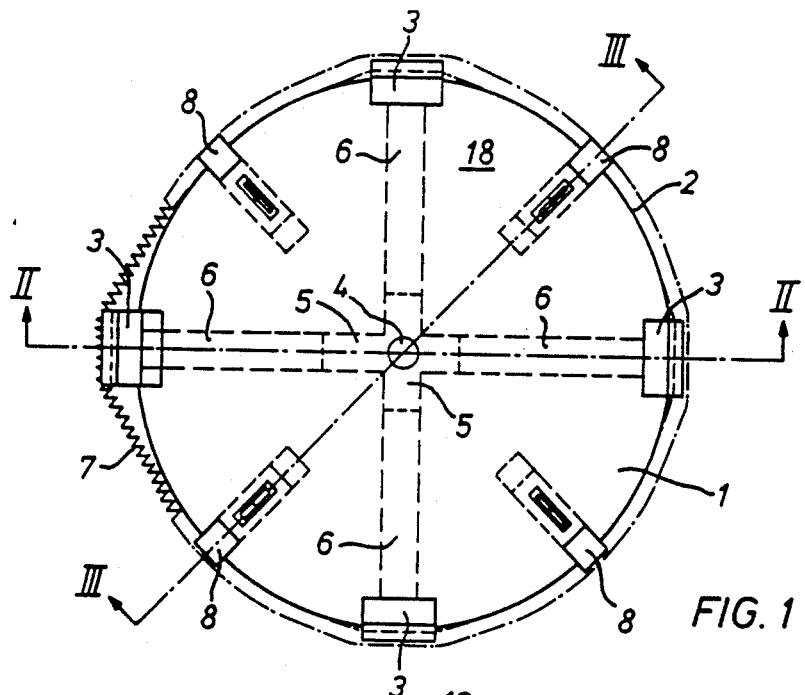

United States Patent [19]

Toral

[11] Patent Number: 4,861,086
[45] Date of Patent: Aug. 29, 1989

[54] APPARATUS FOR TAKING UP AND DEPOSITING SPOOLS

[75] Inventor: José Toral, Munich, Fed. Rep. of Germany

[73] Assignee: AGFA-Gevaert Aktiengesellschaft, Leverkusen, Fed. Rep. of Germany

[21] Appl. No.: 73,003

[22] Filed: Jul. 13, 1987

[30] Foreign Application Priority Data

Jul. 18, 1986 [DE] Fed. Rep. of Germany ....... 3624307

[51] Int. Cl.$^4$ .......................... B25J 15/10; B65H 19/30
[52] U.S. Cl. ............................................ 294/88; 279/4; 279/110; 294/119.1
[58] Field of Search ................ 294/86.4, 88, 93, 119.1; 269/25-27, 30, 104, 109, 112, 118, 153, 155-157, 216, 218; 279/4, 17, 66, 110

[56] References Cited

U.S. PATENT DOCUMENTS

| | | | |
|---|---|---|---|
| 2,977,128 | 3/1961 | Judelson | 279/10 |
| 3,142,491 | 7/1964 | Ohashi | 279/4 |
| 3,177,744 | 4/1965 | Davidson et al. | 279/66 |
| 3,904,214 | 9/1975 | Manchester | 279/110 X |
| 4,453,757 | 6/1984 | Soraoka | 294/119.1 |
| 4,479,673 | 10/1984 | Inaba et al. | 294/119.1 X |
| 4,547,012 | 10/1985 | Krebs | 294/93 |
| 4,669,161 | 6/1987 | Sekelsky | 294/119.1 X |

FOREIGN PATENT DOCUMENTS

931468  6/1982  U.S.S.R. ................. 294/88

OTHER PUBLICATIONS

IBM Technical Disclosure Bulletin, vol. 23, No. 2, Jul. 1980, "Hydraulic-Actuated Clamping Device" by Hendrick et al.

Primary Examiner—Johnny D. Cherry
Attorney, Agent, or Firm—Connolly & Hutz

[57] ABSTRACT

An apparatus for automatically taking up and depositing spools consists of a circular cylindrical body having several radially displaceable claws which can be operated by compressed air uniformly distributed over its cylindrical external surface, which claws are pushed outwards against the force of a spring stretched over the external circumference of the circular body, and axially displaceable, so-called holding down elements which are situated between the claws and under the bias tension of springs to push the mounted spool flange against the bent end of the claws.

3 Claims, 2 Drawing Sheets

APPARATUS FOR TAKING UP AND DEPOSITING SPOOLS

This invention relates to an apparatus for automatically taking up and depositing spools which are rotatably mounted between being taken up and deposited.

At some stage in the automatic manufacture of, for example, video cassettes, it is necessary to use apparatus capable of automatically taking up and depositing one or more spools. In these apparatus, a pair of spools connected by a tape leader are mounted on a so-called winder to be fitted with magnetic tape and subsequently removed or a pair of spools on which a magnetic tape has already been wound is removed from a workpiece holder and inserted in the lower part of a cassette. The apparatus hitherto known are either not rational in their operation or complicated to handle or insufficiently reliable. The spools have to be mounted either by hand or, as shown in DE-OS 3,248,135 (FIG. 11), by means of movable tongs. In the latter case, however, the spools cannot be rotatably mounted as this would damage the magnetic tape situated between them. According to the teaching of DE-OS 3,412,058, the spools are taken up by vacuum suction cups, but this has the disadvantage that the holes shown on the spool flange in FIG. 1, which enable the tape to be clamped to the winding hub, are liable to interfere with the suction process.

The problem therefore arose of providing an automatic spool uptake and depositing device which would not have the disadvantages mentioned above.

The problem was solved according to the invention by means of a circular cylindrical body (1) mounted on a shaft (13) and provided on its cylindrical external surface (2) with at least two radially displaceable claws (3) which have a greater height than the cylindrical body and which are pushed outwards by pistons (6) operated by compressed air flowing through a central bore (4) and channels (5), the said pistons acting against the resistance of a spring (7) connecting all the claws on the cylindrical external surface (2). Furthermore, pins (8) bent at an angle and prestressed by helical springs (9) are arranged between the claws and are displaceable substantially in the axial direction, the upper end of each pin bearing against the periphery of the underside of the spool flange (10).

Details of the invention will be found in the drawings and the description.

Figure 2:
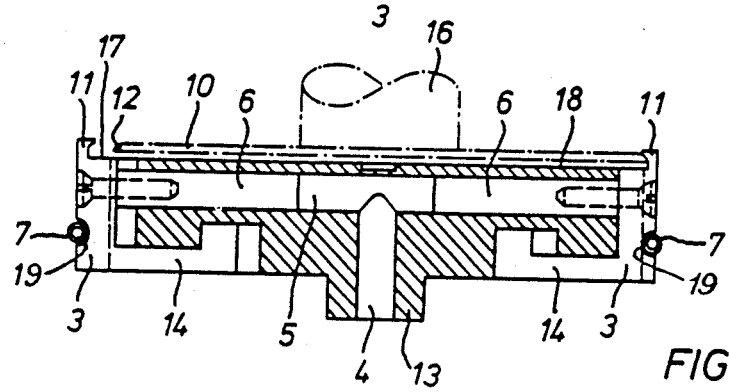
Figure 3:
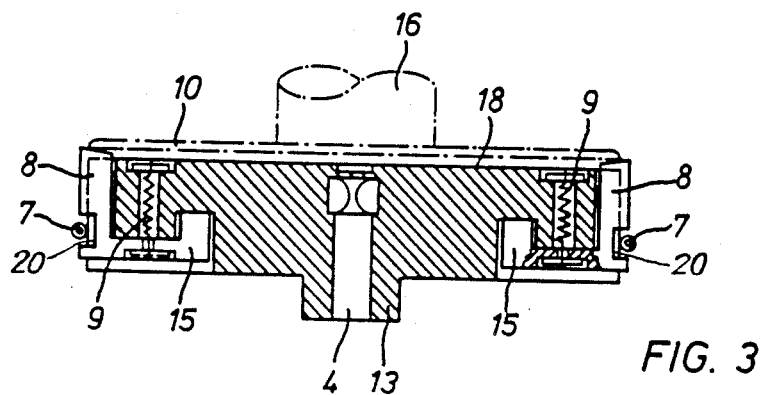
Figure 4:
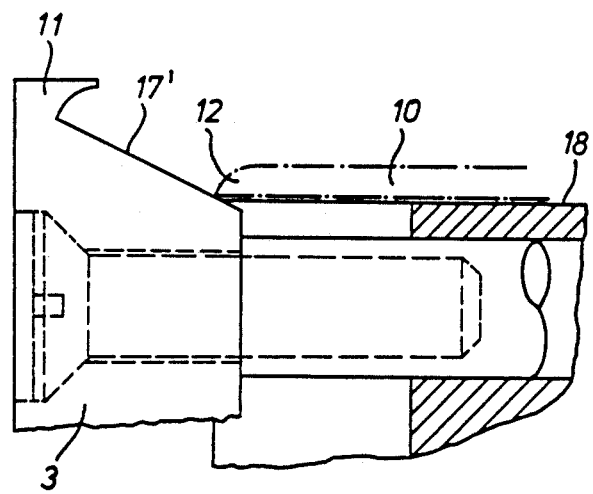

The invention will now be described in more detail with reference to the drawings, in which FIG. 1 is a plan view of the circular cylindrical body according to the invention, FIG. 2 is a cross-section taken on the line II—II of FIG. 1 showing the spool flange lying on the cylindrical body, FIG. 3 is a cross-section taken on the line III—III of FIG. 1 showing the spool flange in position, and FIG. 4 represents a section taken out of FIG. 2 with a variation of the apparatus according to the invention.

As shown in FIG. 1, the circular cylindrical body (1) mounted on the fixed shaft or pivot (13) has at least two, preferably more than six and in a particularly preferred embodiment at least 10 radially displaceable claws (3) bent at an angle, preferably distributed equidistantly over its cylindrical external surface (2). The height of the claws is greater at the external circumference than the height of the circular cylindrical body so that the upper ends (11) of the claws, which are bent off at an angle, act as grippers to grip the mounted spool flange (10) on its outer edge as shown in FIG. 2. The bent upper end (11) of the claws, which grips the spool flange, is suitably adapted to the form of the edge (12) of the spool flange so that it projects only slightly over the upper surface of the flange, on which the wound tape lies. The pistons (6) may be supplied with compressed air from a central bore (4) in the cylindrical body through channels (5) of which there is one associated with each claw. The pistons are preferably connected rigidly with the claws and push the claws outwards when acted upon by the compressed air, as shown on the left in FIGS. 1 and 2. The lower part (14) of each claw is mounted in a guide with stops in the cylindrical body. A groove 19 is provided on the external surface of each claw to act as support for the helical spring (7) stretched round the external surface of this circular cylindrical body. In the absences of compressed air, the helical spring pushes the claws inwards to the stop.

Pins (8) bent at an angle, so-called holding down pins, are also situated on the external cylindrical surface, between the claws (FIG. 3). Each pin (8) is held in position by its bent end (15) being inserted in a bore in the body (1). The pins (8) are attached to helical springs (9) which are situated in bores in the cylindrical body (1) and fixed to the internal surface of the base (18) of the body (1). These springs (9) which are under a bias tension pull the pins upwards. Each pin has a groove 20 on its external surface similar to the grooves on the claws to serve as support for the spring (7). This groove is so designed in the axial direction that the pins (8) are sufficiently movable. A similar groove for supporting the spring (7) may also be formed on the external surface (2) of the cylindrical body (1) between the claws and the pins.

The diameter of the cylindrical body (1) according to the invention is slightly smaller than the diameter of the spool flange (10) which is to be mounted on it, and the cylindrical body may be mounted to pivot as required, for example for taking a video spool from a workpiece holder. For this operation, the claws (3) are first moved outwards by the compressed air and the cylindrical body is mounted with its base (18) on the flange (10) of the video spool while the pins are pushed downwards against the force of the springs (9). When the compressed air ceases to operate, the spring (7) pulls the claws (3) inwards, whereupon the claws (3) grip the edge (12) of the flange (10). The cylindrical body can then be lifted off by suitable operation of the workpiece holder, whereupon the pins which are under the tension of their springs press the spool flange against the bent upper end (11) of the claws (3) so that the claws project only slightly above the inner side of the spool flange, as shown on the righthand side of FIG. 2. Consequently, if the cylindrical body is rotatably mounted on the shaft (13) and if the spool carries a leader tape or magnetic tape, the said tape can be wound on or off the spool as soon as the spool has been removed from the workpiece holder. This is possible, firstly because the width of the magnetic tape is slightly less than the height of the winding hub (16) indicated in FIGS. 2 and 3, which constitutes the distance of the flanges, and secondly, as explained above, the claws are so designed according to the invention that they project only slightly above the flange so that the risk of deformation of the edges of the tape is very slight. For depositing the spool or mounting it on a winder, the claws are again pushed outwards by compressed air to release the spool.

In one variation of the apparatus according to the invention, the internal surface (17) of the claws (3), facing the external surface of the flange (10), is not parallel to the base (18) of the cylindrical body as in FIG. 2 but slopes upwards in the form of a cone (17') as shown in FIG. 4. When such a cylindrical body is mounted on the spool flange while the claws are moved outwards and the supply of compressed air is stopped, then the conical surface (17') of the claws which have been pushed inwards by the spring (7) move the spool flange upwards into the bent ends (11) of the claws, so that in this embodiment the pins (8) may be omitted. In that case, the claws preferably take up most of the cylindrical external surface (2) of the circular body and their external surfaces are cylindrical to conform to the surface (2).

In another variation which also obviates the use of pins as holding down devices, one or more yielding spring elements are uniformly distributed over the base (18) of the circular body to press the mounted spool flange against the bent ends of the claws. These springy elements may be balls inside sleeves seated in recesses of the round body, and these balls may be put under a bias tension by springs so that the balls partly project from the surface of the base. Leaf springs riveted or screwed to the surface of the base on one side and pressing with their free end against the spool flange are also suitable. In such an arrangement, the element pressing against the spool flange should be made of a relatively soft material so as not to scratch the flange and the springy elements should be so positioned that they do not encounter the previously mentioned holes on the spool flange.

The advantages of the apparatus according to the invention compared with those known in the prior art may be summarized as follows:

Gentle and reliable taking up of the spools even when the spools are not quite accurately positioned in the workpiece holder; this is important for streamlined production;

the tape can be wound on or off as soon as the apparatus according to the invention has gripped the spool or pair of spools.

I claim:

1. Apparatus for automatically taking up and depositing one or more spools, consisting of a hub and at least one flange on each side, which apparatus is mounted to rotate, characterised by a circular body (1) seated on a shaft (13) and having a diameter slightly smaller than the diameter of the spool flange (10) which is to be mounted thereon, at least two radially displaceable claws (3) being seated on the cylindrical external surface (2) of said circular body (1), the height of which claws (3) is greater on the outside than the height of the circular cylindrical body (1), which claws are pushed outwards by pistons (6) operated by compressed air from a central bore (4) and channels (5) and acting against the resistance of a spring (7) connecting all the claws (3) on the cylindrical external surface (2), bent pins (8) which are put under the bias tension of helical springs (9) and displaceable substantially in an axial direction being situated between the claws (3), the top ends of which pins (8) can be applied to the periphery of the underside of the spool flange (10).

2. Apparatus according to claim 1, characterised in that the upper end (11) of the claws (3), which end grips the spool flange (10), is bent over and adapted to catch the outer edge (12) of the spool flange (10).

3. Apparatus according to claims 1 or 2, characterised in that the surface (17') of the claws (3) adjacent to the external surface of the spool flange (10) slopes outwards and upwards in the form of an inclined surface.

* * * * *